UNITED STATES PATENT OFFICE.

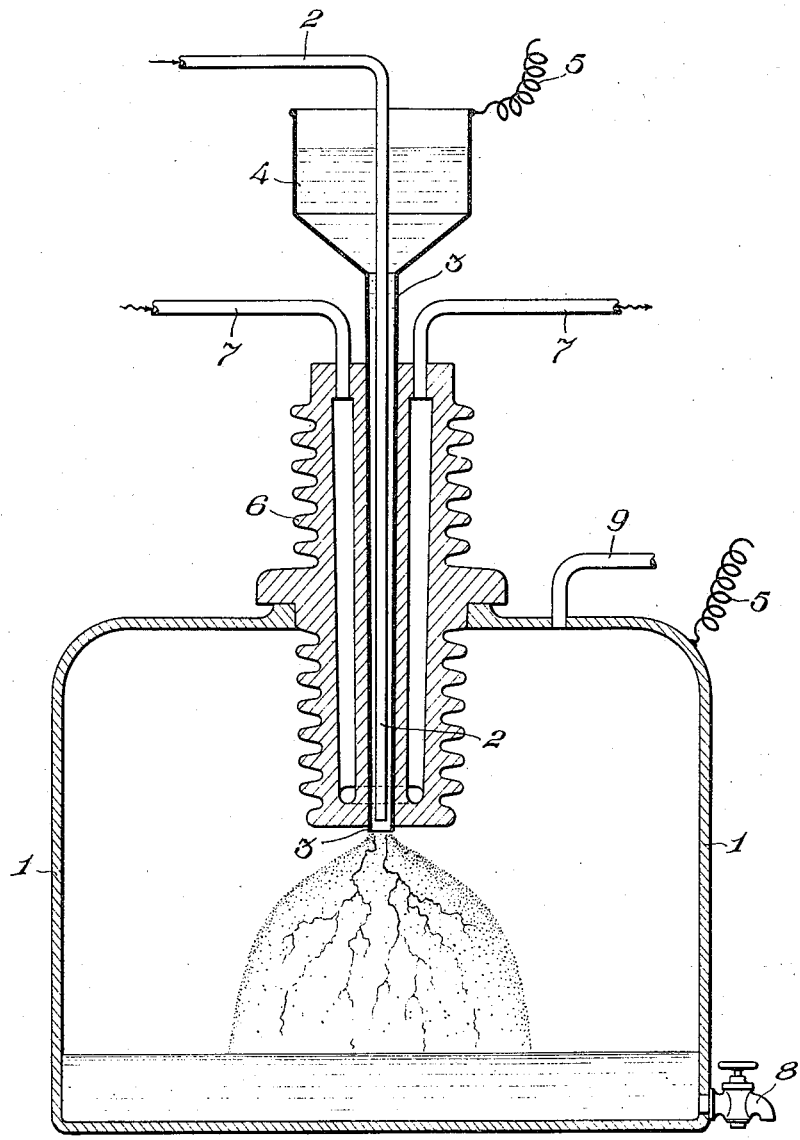

YOSHINAO KAWAKITA, OF KAMOTO-GUN, KUMAMOTO-KEN, JAPAN.

METHOD OF PRODUCING NITRIC ACID.

1,371,789. Specification of Letters Patent. Patented Mar. 15, 1921.

Application filed April 2, 1918. Serial No. 226,260.

*To all whom it may concern:*

Be it known that I, YOSHINAO KAWAKITA, a subject of the Empire of Japan, residing at 179 Uekimachi, Kamoto-Gun, Kumamoto-Ken, Japan, have invented certain new and useful Improvements in Methods of Producing Nitric Acid, of which the following is a specification.

In atmospheric lightning discharges, nitrogen is transformed into nitric acid under the action of oxygen and water, and the nitric acid thus formed is absorbed by billions of raindrops and falls to the earth. Recognizing this natural phenomenon, I have devised the present method of causing electric spark discharges to pass through the mixed gas of nitrogen and oxygen in the presence of numberless waterdrops, so that I obtain results substantially the same as those provided by nature.

According to the investigations made by Haber and Nernst regarding the formation of nitric acid, the necessary conditions thereof may be presumed as follows: Air is heated to a high temperature to form nitrogen oxids, then it is cooled as suddenly as possible in order to prevent the decomposition of the nitrogen oxids, and the latter acting upon water and oxygen in the air are transformed into nitric acid.

Even if we rely upon the best one of the arc processes the heating of the air to a high temperature can not be easily practised, and also the cooling thereof is comparatively slow, so that only 3% of the total electric power consumed can be utilized for the production of nitric acid.

Though the amount of nitric acid formed under the action of lightning seems to be very small, still it being not less than 0.00005% of the total rain-water, the efficiency of atmospheric discharge for the production of nitric acid should not be estimated so small. Considering, therefore, that the electric efficiency of atmospheric discharges may be superior to that of arc processes, the inventor has turned his thoughts to the subject of this invention.

In case of heating air by electric power, as a general rule, spark discharges produce a very large amount of energy for a minimum time; so that the electric energy in the discharge becomes exceedingly great, and the air will be heated to the high temperature of several thousands degrees C. for a minute fraction of a second, whereby the heating can be obtained effectively by a comparatively small amount of energy, without the loss of heat due to the action of conduction and radiation.

But, in the case of arc processes, the instantaneous value of current is not so high as in the case of spark discharges, so that the heating action is carried out slowly, and the loss of energy must be very large.

According to the present invention, innumerable water-drops exist in the passage of the sparks, and these water-drops, at the moment of discharge, are not heated, while, for the next moment, they are caused to evaporate in an instant, and thus, the decomposition of nitrogen oxids is prevented and also the formation of nitric acid is increased.

In carrying the invention into effect, attention is called to the fact that electric sparks must be made as long as possible, and that greater resistance is to be given in the passage of the sparks, and also that self-induction of the circuit should be made as small as possible. Thus, oscillatory discharges are prevented and the loss of energy due to the production of electric waves and other useless induction can be minimized.

Though oscillatory discharges seem to be fitted to the conditions of sudden heating and sudden cooling, the frequency of electric current being many thousands per second, the thermal capacity of air is not so small as to correspond to it, therefore, the oscillatory discharge is wasted in its neighboring conductors or is transformed into electric waves.

My invention therefore relates broadly to a method of producing nitric acid by subjecting innumerable water-drops suspended freely in the air, to the action of electric sparks.

In order to completely perform the high heating and quick cooling necessary to the formation of nitric acid, I cause the air to receive a considerable amount of heat from electric sparks, which quickly heat the air to a high temperature and the gas combined under the spark treatment is then suddenly cooled by the action of evaporation of water-drops. By this method I am enabled to render the production of nitric acid more effective than with the arc processes.

The accompanying drawing shows an example of an apparatus adapted to carry out the invention, wherein a gas supply pipe 2 is arranged at the center of a vessel 1 made of acid-proof material, and air or a mixture of oxygen and nitrogen in appropriate proportions is supplied through the pipe, under a suitable pressure to the vessel. A water supply pipe 3 having a funnel 4 on its upper end is arranged around the outer periphery of the gas pipe 2 and spaced therefrom, and the funnel is to be filled with water or dilute nitric acid. The lower end of the water pipe 3 projects slightly below the gas pipe 2, so that when the gas is ejected from the latter, the water flowing down from the former will be atomized to cause innumerable water-drops to be suspended freely in the vessel 1. Electric wires 5, 5 are respectively connected to the vessel 1, and the funnel 4, in order to conduct electric current to the apparatus. Thus, long sparks are caused through the water-drops in the vessel, to pass from the lower end of the water pipe toward the surface of the liquid accumulated in the bottom of the vessel, as shown in the drawing.

The arrangement of the gas supply pipe and the water supply pipe causes the water passing through the water pipe to atomize, furthermore when an electric current flows through the wires 5, the water in the water pipe will function as a conductor for the electric current, so that the water flowing out of the same tends to disperse itself and atomizing action will be more increased.

It will be noted that the wire 5 is attached to the upper end of the water pipe 3 and it will be apparent that during the discharge of electric sparks from the lower end of the water pipe, the water contained in the pipe will function as a conductor for the electric current.

The liquid on the bottom of the vessel 1 is water at the beginning of the operation but gradually accumulates nitric acid as the process proceeds, and thus the high voltage necessary to penetrate the liquid will be lowered thereby. According to circumstances, at the beginning of the process, a few drops of nitric acid may be added to the water in the funnel 4, whereby a low voltage will be sufficient even at the beginning of the operation.

As illustrated in the drawing, the water pipe 3 fits within the center of a hollow tube 6 made of electric insulating material, and the said tube is attached to the vessel 1.

Hot air is supplied into the hollow space of the tube 6 by means of pipes 7, 7 made of electric insulating material, in order to keep the said tube under a high temperature during operation, with the result that the water adhering to the surface of the tube is evaporated immediately, whereby any short circuit through the water will be absolutely prevented.

A drain cock 8 and an exhaust pipe 9 are respectively provided at the bottom and the top of the vessel 1.

As soon as electric sparks occur in the above mentioned apparatus, the mixture of gases is caused to be instantaneously heated to an extremely high temperature, and nitrogen oxids are formed.

The sparks are generated intermittently and the moment the discharge takes place, they function to heat the mixed gas, while for the next moment, as soon as the sparks disappear, the heat acts on the water-drops to evaporate the latter. Owing to the said evaporation, the heat of the gas given for the previous moment is quickly taken away, so that the said gas, being prevented from decomposing is transformed into nitric acid under the action of the water drops and oxygen.

The nitric acid accumulating in the bottom of the vessel 1 being drawn off through the cock 8 may be poured back into the funnel 4, and if this operation is repeated, more concentrated nitric acid can be gradually obtained.

What I claim and desire to secure by Letters Patent is:

1. A method of producing nitric acid consisting in forcing a jet of air under pressure into a chamber containing water, causing said air to draw a jet of water into said chamber and to atomize said water, intermittently passing an electric current through said jet of water and passing electric sparks between the jet of water and the water contained in the tank to rapidly heat the air to a high temperature and form nitrogen oxids, causing the heat generated by the sparks to evaporate the atomized water, and utilizing the sudden fall in temperature created by said evaporation to cool the gas generated and form nitric acid.

2. A method of the kind defined by claim 1 including the step of heating said jets of water and air.

3. An apparatus for producing nitric acid comprising a tank connected to one wire of a source of electric current, an insulated plug extending into said tank, a water pipe extending through the plug and having its outlet within the tank, an air supply pipe extending through the water pipe and having its outlet end arranged within the water pipe near the outlet end of the same, and a second electric wire of the source of electric current connected to the water pipe.

4. An apparatus of the kind defined by claim 3 in which the plug is provided with an internal chamber surrounding said pipes, and means for heating said chamber.

YOSHINAO KAWAKITA.

Witnesses:
 DEN KIDO,
 EISHIRO ABE.